United States Patent [19]
Veras

[11] Patent Number: 5,782,205
[45] Date of Patent: Jul. 21, 1998

[54] WINDOW MOUNTED COMBINATION PORCH AND CAGE SYSTEM

[76] Inventor: Richard Veras, 43 Hollywood Ave., Cranford, N.J. 07016

[21] Appl. No.: 779,847

[22] Filed: Jan. 7, 1997

[51] Int. Cl.⁶ ............................................. A01K 1/03
[52] U.S. Cl. ................................................. 119/484
[58] Field of Search ............................. 119/484, 452, 119/473, 501, 472, 474

[56] References Cited

U.S. PATENT DOCUMENTS

| | | | |
|---|---|---|---|
| 3,738,322 | 6/1973 | Smith | 119/484 |
| 5,220,882 | 6/1993 | Jenkins | 119/420 |
| 5,261,350 | 11/1993 | Vavrek | 119/484 |
| 5,522,344 | 6/1996 | Demurjian | 119/474 |

*Primary Examiner*—Michael J. Carone
*Assistant Examiner*—Yvonne R. Abbott

[57] ABSTRACT

A new Window Mounted Combination Porch and Cage System for providing a house pet an extended view of the outdoors through a conventional window. The inventive device includes a container having a floor, a pair of side walls and an arcuate roof, an upper lip secured to the arcuate roof, a lower lip secured to the floor and a plurality of ventilation apertures. The container is preferably transparent allowing the pet to view the outdoors or may be alternatively tinted for excluding a portion of ultraviolet light. The upper and lower lips engage the window thereby retaining the container adjacent the window. The pet accesses the interior portion of the container through the open window which retains the container. Alternatively, a wire cage is formed to fit within the interior portion for allowing pets such as birds and lizards to view the outdoors and receive fresh air.

10 Claims, 3 Drawing Sheets

WINDOW MOUNTED COMBINATION PORCH AND CAGE SYSTEM

BACKGROUND OF THE INVENTION

1. Field of the Invention

The present invention relates to Window Perch Devices and more particularly pertains to a new Window Mounted Combination Porch and Cage System for providing a house pet an extended view of the outdoors through a conventional window.

2. Description of the Prior Art

The use of Window Perch Devices is known in the prior art. More specifically, Window Perch Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Window Perch Devices include U.S. Pat. No. 5,167,202; U.S. Pat. No. 5,148,767; U.S. Design Pat. No. 272,569; U.S. Pat. No. 4,057,031; U.S. Pat. No. 5,351,648 and U.S. Pat. No. 5,195,457.

While these devices fulfill their respective, particular objectives and requirements, the aforementioned patents do not disclose a new Window Mounted Combination Porch and Cage System. The inventive device includes a container having a floor, a pair of side walls and an arcuate roof, an upper lip secured to the arcuate roof, a lower lip secured to the floor and a plurality of ventilation apertures.

In these respects, the Window Mounted Combination Porch and Cage System according to the present invention substantially departs from the conventional concepts and designs of the prior art, and in so doing provides an apparatus primarily developed for the purpose of providing a house pet an extended view of the outdoors through a conventional window.

SUMMARY OF THE INVENTION

In view of the foregoing disadvantages inherent in the known types of Window Perch Devices now present in the prior art, the present invention provides a new Window Mounted Combination Porch and Cage System construction wherein the same can be utilized for providing a house pet an extended view of the outdoors through a conventional window.

The general purpose of the present invention, which will be described subsequently in greater detail, is to provide a new Window Mounted Combination Porch and Cage System apparatus and method which has many of the advantages of the Window Perch Devices mentioned heretofore and many novel features that result in a new Window Mounted Combination Porch and Cage System which is not anticipated, rendered obvious, suggested, or even implied by any of the prior art Window Perch Devices, either alone or in any combination thereof.

To attain this, the present invention generally comprises a container having a floor, a pair of side walls and an arcuate roof, an upper lip secured to the arcuate roof, a lower lip secured to the floor and a plurality of ventilation apertures.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Window Mounted Combination Porch and Cage System apparatus and method which has many of the advantages of the Window Perch Devices mentioned heretofore and many novel features that result in a new Window Mounted Combination Porch and Cage System which is not anticipated, rendered obvious, suggested, or even implied by any of the prior art Window Perch Devices, either alone or in any combination thereof It is another object of the present invention to provide a new Window Mounted Combination Porch and Cage System which may be easily and efficiently manufactured and marketed.

It is a further object of the present invention to provide a new Window Mounted Combination Porch and Cage System which is of a durable and reliable construction.

An even further object of the present invention is to provide a new Window Mounted Combination Porch and Cage System which is susceptible of a low cost of manufacture with regard to both materials and labor, and which accordingly is then susceptible of low prices of sale to the consuming public, thereby making such Window Mounted Combination Porch and Cage System economically available to the buying public.

Still yet another object of the present invention is to provide a new Window Mounted Combination Porch and Cage System which provides in the apparatuses and methods of the prior art some of the advantages thereof, while simultaneously overcoming some of the disadvantages normally associated therewith.

Still another object of the present invention is to provide a new Window Mounted Combination Porch and Cage System for providing a house pet an extended view of the outdoors through a conventional window.

Yet another object of the present invention is to provide a new Window Mounted Combination Porch and Cage System which includes a container having a floor, a pair of side walls and an arcuate roof, an upper lip secured to the arcuate roof, a lower lip secured to the floor and a plurality of ventilation apertures.

Still yet another object of the present invention is to provide a new Window Mounted Combination Porch and Cage System that provides a healthier environment for a house pet thereby providing happier and healthier pet.

Even still another object of the present invention is to provide a new Window Mounted Combination Porch and Cage System that prevents the accumulation of water upon the roof because of the arcuate shape.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
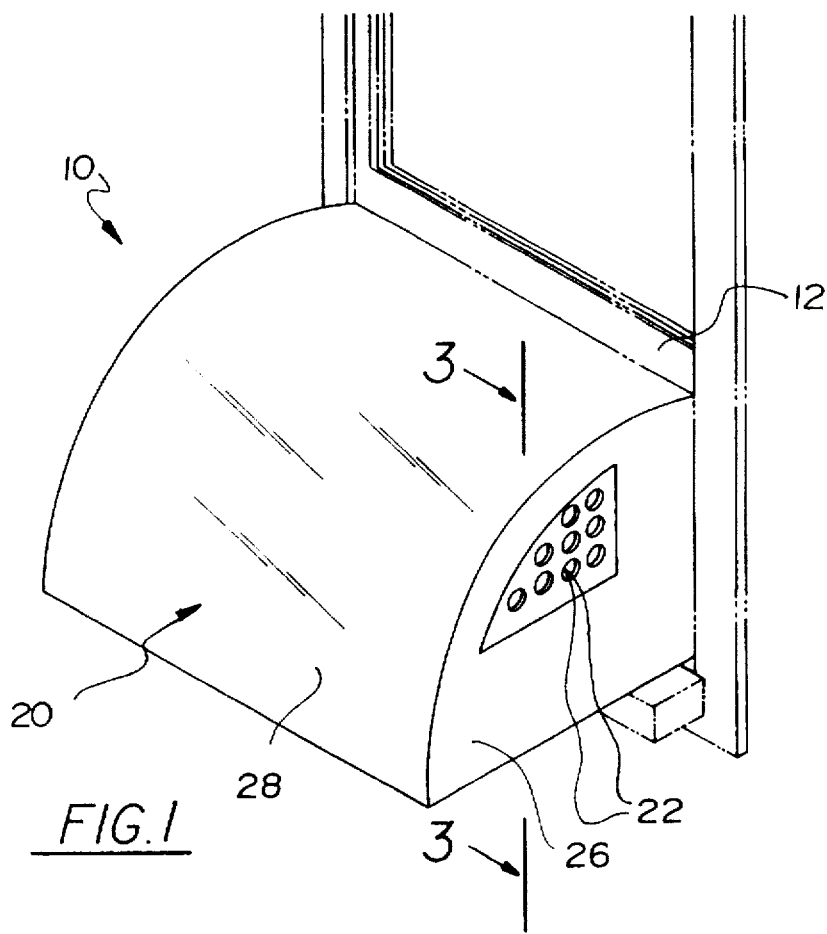
FIG. 1 is an upper perspective view of a new Window Mounted Combination Porch and Cage System according to the present invention.

With reference now to the drawings, and in particular to FIGS. 1 through 6 thereof, a new Window Mounted Combination Porch and Cage System embodying the principles and concepts of the present invention and generally designated by the reference numeral 10 will be described.

Figure 2:
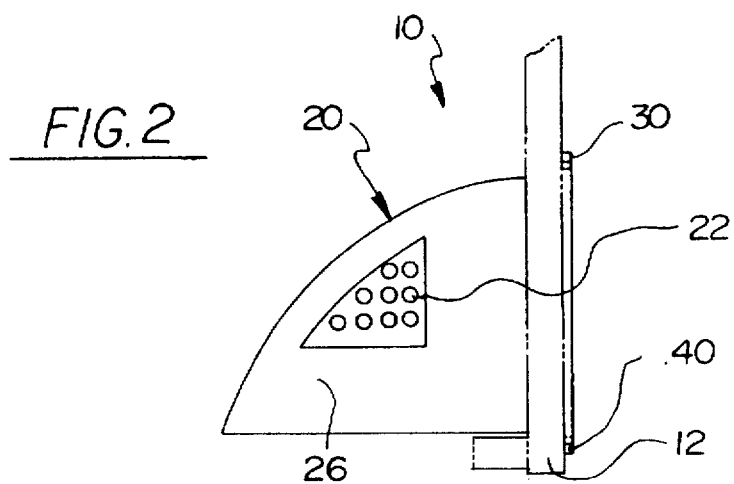
FIG. 2 is a side view of the present invention.

More specifically, it will be noted that the Window Mounted Combination Porch and Cage System 10 comprises a container 20 having a floor 24, side walls 26 and an arcuate roof 28 forming a rectangular opening the size of a conventional window 12, an upper lip 30 secured to the arcuate roof 28 for engaging an upper interior portion the window 12, and a lower lip 40 secured to the floor 24 for engaging a lower interior portion of the window 12 as shown in FIGS. 1 and 2 of the drawings. The container 20 is preferably comprised of a transparent or tinted plastic.

Figure 3:
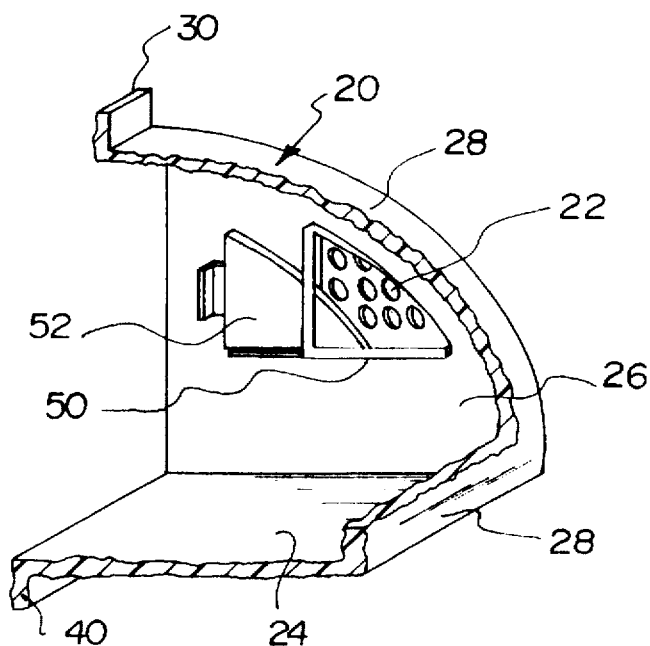
FIG. 3 is an upper perspective cut away view of the present invention.
Figure 4:
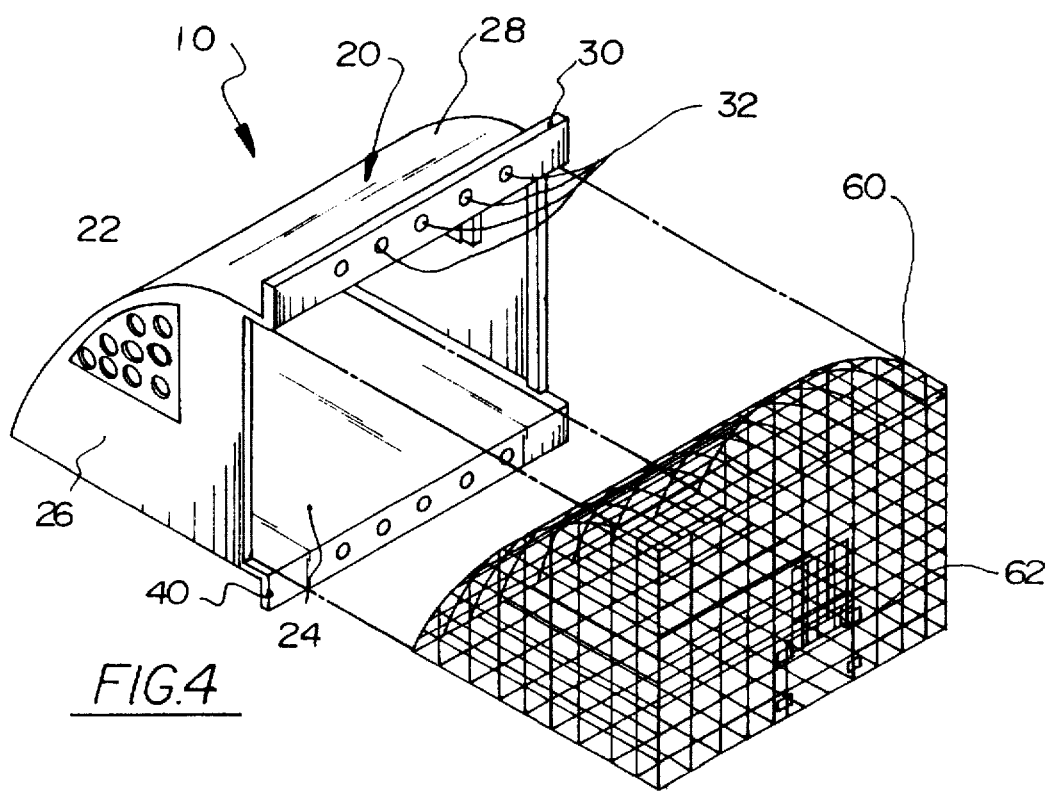
FIG. 4 is an upper perspective view of the wire cage and the container.

As shown in FIGS. 1 through 4 of the drawings, the container 20 includes a plurality of ventilation apertures 22 into the side walls 26 for providing ventilation to a house pet. A track 50 is secured to the side walls 26 for slidably receiving a vent cover 52 for selectively covering the ventilation apertures 22 during unfavorable weather conditions as shown in FIGS. 3 and 4 of the drawings. The upper lip 30 and the lower lip 40 preferably have a plurality of securing apertures 32 for receiving a convention fastener which engages the window 12. As shown in FIG. 4 of the drawings, a wire cage 60 has a door 62. The wire cage 60 is formed to slidably fit an interior portion of the container 20 for allowing pets such as birds and lizards to view the outdoors.

Figure 5:
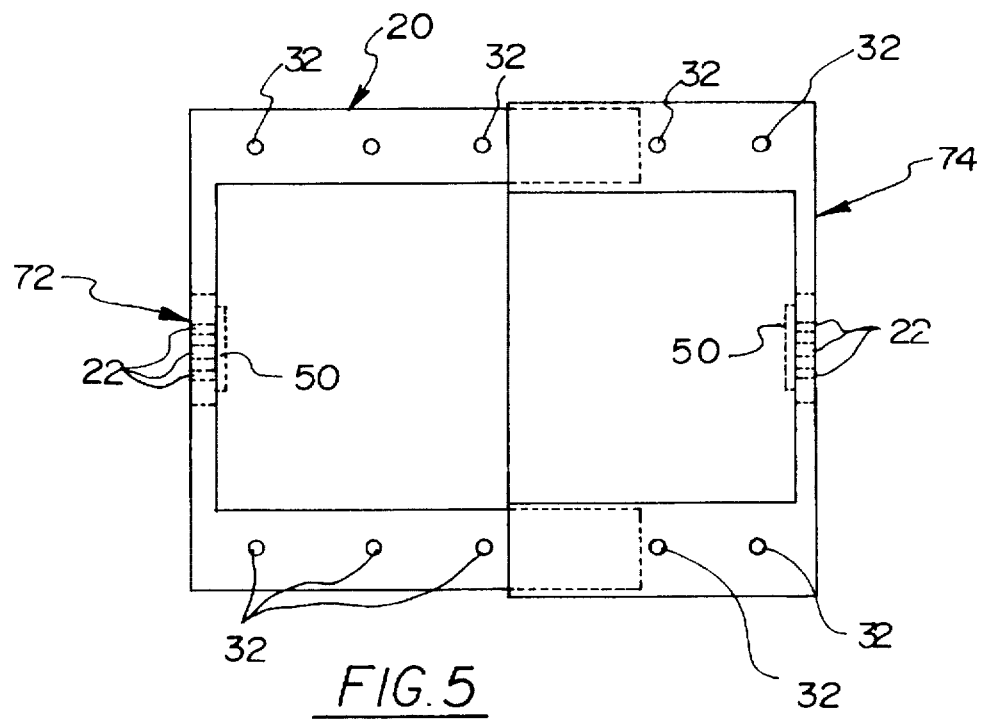
FIG. 5 is a rear view of an alternative embodiment comprising a first half and a second half of the container.
Figure 6:
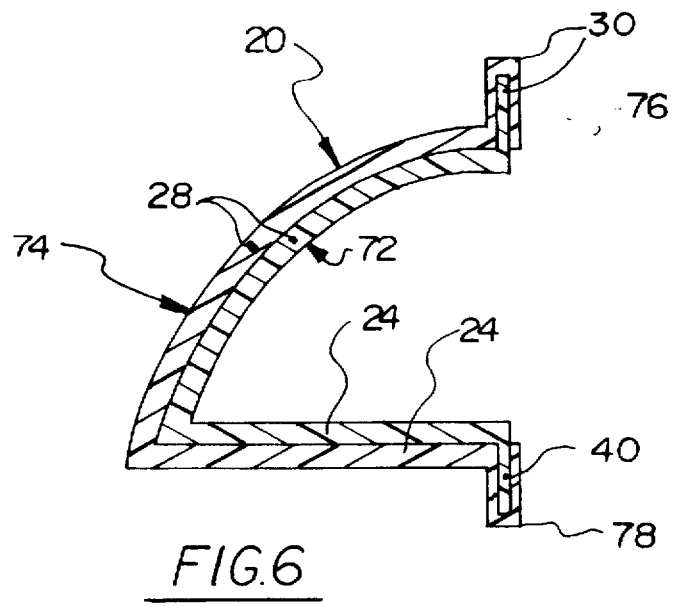
FIG. 6 is a cross sectional view taken along line 6—6 of FIG. 5.

In an alternative embodiment as shown in FIGS. 5 and 6 of the drawings, the container 20 is split into a first half 72 and a second half 74. An upper slot 76 projects into the upper flange of the second half 74 for slidably receiving the upper flange of the first half 72 as best shown in FIG. 6 of the drawings. A lower slot 78 projects into the lower flange of the second half 74 for slidably receiving the lower flange of the first half 72, thereby allowing adjustment of a width of the container 20 for various sizes of the windows 12. The arcuate roof 28 and the floor 24 of the first half 72 are smaller than the second half allowing the first half 72 to slide within an interior portion of the second half 74.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A combination porch and cage system for mounting within a window, the porch and cage system comprising:

a container having a floor, side walls and an arcuate roof extending upwardly from the floor to form a rectangular opening adapted to fit within an opening of the window, said container including a plurality of ventilation apertures into said side walls for providing ventilation to a house pet;

an upper lip secured to said arcuate roof adapted for engaging an upper interior portion of the window;

a lower lip secured to said floor, the lower lip adapted for engaging a lower interior portion of the window; and a track secured to said side walls for slidably receiving a vent cover for selectively covering said ventilation apertures during unfavorable weather conditions.

2. The combination porch and cage system of claim 1, wherein said upper lip and said lower lip include a plurality of securing apertures for receiving a conventional fastener.

3. The combination porch and cage system of claim 1, including a wire cage having a door, wherein said wire cage is formed to slidably fit an interior portion of said container.

4. The window mounted combination porch and cage system of claim 1, wherein said container is comprised of a transparent or tinted plastic.

5. A window mounted combination porch and cage system comprising:

a container having a floor, side walls and an arcuate roof forming a rectangular opening the size of a conventional window;

an upper lip secured to said arcuate roof for engaging an upper interior portion of said window;

a lower lip secured to said floor for enraging a lower interior portion of said window wherein said container is split into a first half and a second half;

an upper slot projects into an upper flange of said second half, said upper slot being for slidably receiving an upper flange of said first half; and a lower slot projects into a lower flange of said second half, said lower slot being for slidably receiving a lower flange of said first half, thereby allowing adjustment of a width of said container for various sizes of said windows.

6. The window mounted combination porch and cage system of claim 5, wherein said container includes a plurality of ventilation apertures into said side walls for providing ventilation to a house pet.

7. The window mounted combination porch and cage system of claim 5, including a track secured to said side walls for slidably receiving a vent cover for selectively covering said ventilation apertures during unfavorable weather conditions.

8. The window mounted combination porch and cage system of claim 5, wherein said upper lip and said lower lip include a plurality of securing apertures for receiving a conventional fastener.

9. The window mounted combination porch and cage system of claim 5, including a wire cage having a door, wherein said wire cage is formed to slidably fit an interior portion of said container.

10. The window mounted combination porch and cage system of claim 5, wherein said container is comprised of a transparent or tinted plastic.

* * * * *